(12) United States Patent
Matsumura et al.

(10) Patent No.: US 10,095,088 B2
(45) Date of Patent: Oct. 9, 2018

(54) OPTICAL APPARATUS

(71) Applicant: Olympus Corporation, Hachioji-shi, Tokyo (JP)

(72) Inventors: Naoki Matsumura, Sagamihara (JP); Yukari Takahashi, Hanno (JP); Kei Matsuoka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/614,518

(22) Filed: Jun. 5, 2017

(65) Prior Publication Data
US 2017/0357145 A1 Dec. 14, 2017

(30) Foreign Application Priority Data

Jun. 13, 2016 (JP) .................................. 2016-117062
Apr. 28, 2017 (JP) .................................. 2017-089504

(51) Int. Cl.
| | |
|---|---|
| *G03B 17/02* | (2006.01) |
| *G03B 17/08* | (2006.01) |
| *G02B 27/00* | (2006.01) |
| *G03B 17/30* | (2006.01) |
| *H04N 5/225* | (2006.01) |

(52) U.S. Cl.
CPC .......... *G03B 17/08* (2013.01); *G02B 27/0006* (2013.01); *G03B 17/02* (2013.01); *G03B 17/30* (2013.01); *G03B 2217/002* (2013.01); *H04N 5/2252* (2013.01)

(58) Field of Classification Search
CPC ....................................................... G03B 17/02
USPC .......................................................... 396/363
See application file for complete search history.

(56) References Cited

U.S. PATENT DOCUMENTS

| | | | | |
|---|---|---|---|---|
| 5,657,607 | A * | 8/1997 | Collins | E06B 3/6612 428/34 |
| 5,664,395 | A * | 9/1997 | Collins | E06B 3/6612 156/109 |
| 5,902,652 | A * | 5/1999 | Collins | C03C 27/10 428/34 |
| 6,632,491 | B1 * | 10/2003 | Thomsen | C03C 17/36 156/109 |
| 8,434,904 | B2 * | 5/2013 | Alvarez | F21V 31/005 362/249.02 |

(Continued)

FOREIGN PATENT DOCUMENTS

| | | |
|---|---|---|
| JP | 05-202676 | 8/1993 |
| JP | 09-043723 | 2/1997 |

(Continued)

*Primary Examiner* — Clayton E Laballe
*Assistant Examiner* — Kevin Butler
(74) *Attorney, Agent, or Firm* — John C. Pokotylo; Pokotylo Patent Services

(57) ABSTRACT

An optical apparatus includes a housing including an opening for letting a light flux pass through a first window member configured to let the light flux pass through, and to cover the opening, a second window member, overlapped with and fixed to the first window member, configured to let the light flux pass through, and a sealing member that is made of a stretchable material, and that is provided along an outer edge of the first window member or the second window member so as to form a sealed space portion between the first window member and the second window member.

9 Claims, 9 Drawing Sheets

(56) References Cited

U.S. PATENT DOCUMENTS

| | | | | |
|---|---|---|---|---|
| 2009/0151853 A1* | 6/2009 | Cooper | ................ | E06B 3/6612 |
| | | | | 156/104 |
| 2009/0151854 A1* | 6/2009 | Cooper | .................... | C03C 8/24 |
| | | | | 156/109 |
| 2016/0154198 A1* | 6/2016 | Alasimio | ............... | G03B 17/02 |
| | | | | 348/335 |
| 2016/0295081 A1* | 10/2016 | Graff | .................... | H04N 5/2254 |

FOREIGN PATENT DOCUMENTS

| | | | | | |
|---|---|---|---|---|---|
| JP | 2003-284210 | * | 3/2002 | ............... | H02B 1/28 |
| JP | 2003-284210 | | 10/2003 | | |
| JP | 2005-333290 | | 12/2005 | | |
| JP | 2014240333 | * | 11/2013 | ............. | C09C 27/06 |
| JP | 2014-240333 | | 12/2014 | | |

\* cited by examiner

OPTICAL APPARATUS

This application claims the benefit of Japanese Applications No. 2016-117062 filed in Japan on Jun. 13, 2016 and No. 2017-089504 filed in Japan on Apr. 28, 2017, the contents of which are incorporated herein by their reference.

BACKGROUND OF THE INVENTION

1. Field of the Invention

The present invention relates to an optical apparatus provided with an opening window having a waterproof property and an anti-fog property.

2. Description of the Related Art

Conventionally, various electronic apparatuses for various applications are put to practical use and are widely employed. For example, an optical apparatus to be used in a harsh environment, such as underwater or on a high mountain, by having an apparatus housing of a sealed structure and achieving a structure which has excellent waterproof and dustproof properties and which gives consideration to impact resistance and weatherability is put to general practical use.

Examples of such a type of optical apparatus include an image pickup apparatus for acquiring still images and movies, for example. Such a type of image pickup apparatus is configured to be able to acquire image signals by sequentially converting optical images formed by an image pickup optical system or the like into image signals by using an image pickup device or the like, and to sequentially and continuously display images based on the acquired image signals by using a display apparatus. Moreover, the image pickup apparatus includes a function of acquiring, at the time of occurrence of an image pickup instruction signal, image signals of still images or a movie at the time point of occurrence of the instruction signal or for a predetermined period of time before and after the time point, of converting the image signals into image data of a predetermined mode, and of recording the image data in a storage medium. Furthermore, at the time of occurrence of a reproduction instruction signal, the image pickup apparatus is capable of converting the image data recorded in the storage medium into an image signal of a predetermined mode, and of reproducing and displaying an image based on the image signal by using the display apparatus.

Conventionally, such a type of image pickup apparatus has an opening window provided to a front surface of the housing, the opening window being for guiding a light flux from an object into the apparatus housing. A flat plate-shaped transparent member (for example, a plate glass) is disposed in the opening window such that a light flux from an outside object can be guided into the apparatus housing while maintaining water-tightness and airtightness inside the housing, and maintaining the waterproof property and the dustproof property.

When an image pickup apparatus (optical apparatus) having such a configuration is brought into a low temperature environment, such as underwater or outdoor, a temperature difference is caused between the inside and the outside of the housing of the image pickup apparatus, and condensation may occur on the flat plate-shaped transparent member provided to the opening window of the apparatus, on the inside of the housing.

Accordingly, as a configurational improvement for preventing occurrence of condensation in such a use situation, use of a so-called multipane window structure having a multiple layer of flat plate-shaped transparent members for the opening window is easily conceivable.

Conventionally, various proposals have been made by Japanese Patent Application Laid-Open Publication No. 5-202676, Japanese Patent Application Laid-Open Publication No. 2003-284210, and Japanese Patent Application Laid-Open Publication No. 2014-240333, for example, with respect to use of a multipane window structure as a measure for achieving a thermal insulation property, a sound insulation property and the like while giving consideration to the anti-fog property and condensation prevention for the opening window.

Japanese Patent Application Laid-Open Publication No. 5-202676 illustrates a multipane window structure which is applied to a window portion separating the inside and the outside of a vehicle. Also, Japanese Patent Application Laid-Open Publication No. 2003-284210 discloses a multipane window structure which is applied to an inspection window of an electrical distribution board installed outdoors. Moreover, Japanese Patent Application Laid-Open Publication No. 2014-240333 proposes an improvement regarding a multipane window structure which is applied to a window portion separating the inside and the outside of a building. Note that a double pane window structure which uses two flat plate members is described as an example of the structure disclosed in each of Patent Documents mentioned above.

The multipane window structures conventionally proposed are easily considered to be applicable to an opening window, of an optical apparatus, having a waterproof property, a dustproof property, and an anti-fog property.

To realize a high waterproof property, dustproof property and the like for the purpose of use in a harsh environment, such as underwater or on a high mountain, a structure for reliably securing airtightness at the opening window, and for maintaining the airtightness becomes important. That is, with such a type of optical apparatus, the inside of the housing is generally sealed off from the outside of the housing.

SUMMARY OF THE INVENTION

An optical apparatus according to an aspect of the present invention includes a housing including an opening for letting a light flux pass through, a first window member configured to let the light flux pass through, and to cover the opening, a second window member, overlapped with and fixed to the first window member, configured to let the light flux pass through, and a sealing member that is made of a stretchable material, and that is provided along an outer edge of the first window member or the second window member so as to form a sealed space portion between the first window member and the second window member.

The advantages of the present invention will be made apparent from the detailed description below.

DETAILED DESCRIPTION OF THE PREFERRED EMBODIMENT(S)

Figure 1:
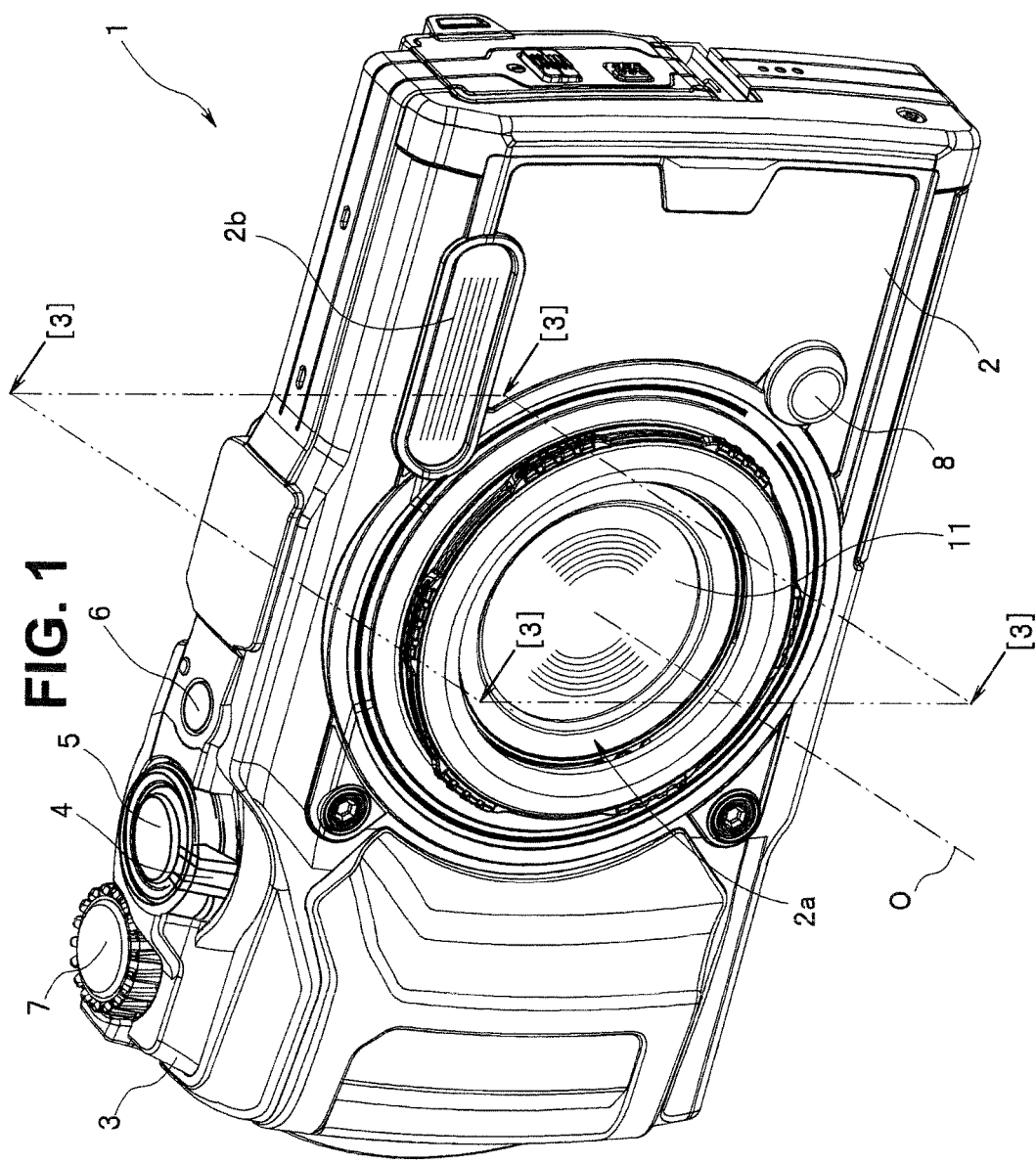
FIG. 1 is an external perspective view mainly showing a front surface of an optical apparatus (an image pickup apparatus) according to an embodiment of the present invention.

Hereinafter, the present invention will be described based on an embodiment illustrated in the drawings. Each of the drawings used for description below is merely schematic, and the dimensional relationship, the scale and the like of each member are sometimes shown differently between respective structural components so that each structural component is shown in the drawings with a recognizable size. Accordingly, the present invention is not limited to the modes shown in the drawings with respect to the number of structural components, the shapes of the structural components, the proportion of the sizes of the structural components, the relative positional relationship of respective structural components and the like shown in the respective drawings.

As an optical apparatus according to an embodiment of the present invention, an image pickup apparatus is cited as an example, the image pickup apparatus having a sufficient waterproof property and dustproof property due to a sealed structure of an apparatus housing and also having impact resistance and weatherability so as to be used in an environment such as underwater or on a high mountain, or more specifically, in a harsh environment where a water pressure higher than in normal circumstances is applied or where the air pressure is greatly changed than in normal circumstances. Specifically, the image pickup apparatus sequentially converts optical images formed by an image pickup optical system or the like into image signals by using an image pickup device or the like, and sequentially and continuously displays images based on the acquired image signals by using a display apparatus. Moreover, at the time of occurrence of an image pickup instruction signal, the image pickup apparatus acquires image signals of still images or a movie at the time point of occurrence of the instruction signal or for a predetermined period of time before and after the time point. The image pickup apparatus then converts the acquired image signals into image data of a predetermined mode, and records the image data in a storage medium. Furthermore, at the time of occurrence of a reproduction instruction signal, the image pickup apparatus is capable of converting the image data recorded in the storage medium into an image signal of a predetermined mode, and of reproducing and displaying an image based on the image signal by using the display apparatus. Moreover, the image pickup apparatus has a waterproof property so as to be used in water, and also has a dustproof property, impact resistance and weatherability.

Note that, in the present embodiment, each surface of the image pickup apparatus is defined as below. The surface facing an object at the time of use of the image pickup apparatus is referred to as a front surface. Also, the surface facing the user at the time of use of the image pickup apparatus is referred to as a rear surface. Also, the surface where a shutter release button or the like, among a plurality of operation members provided to the image pickup apparatus, is disposed is referred to as a top surface. Furthermore, the surface facing the top surface of the image pickup apparatus is referred to as a bottom surface. Moreover, the surfaces on both sides in a normal use state of the image pickup apparatus are referred to as a left side surface and a right side surface. The left and right in the present case are distinguished from each other with the left side and the right side of the front surface of the image pickup apparatus seen from the object side being the left and the right.

Figure 2:
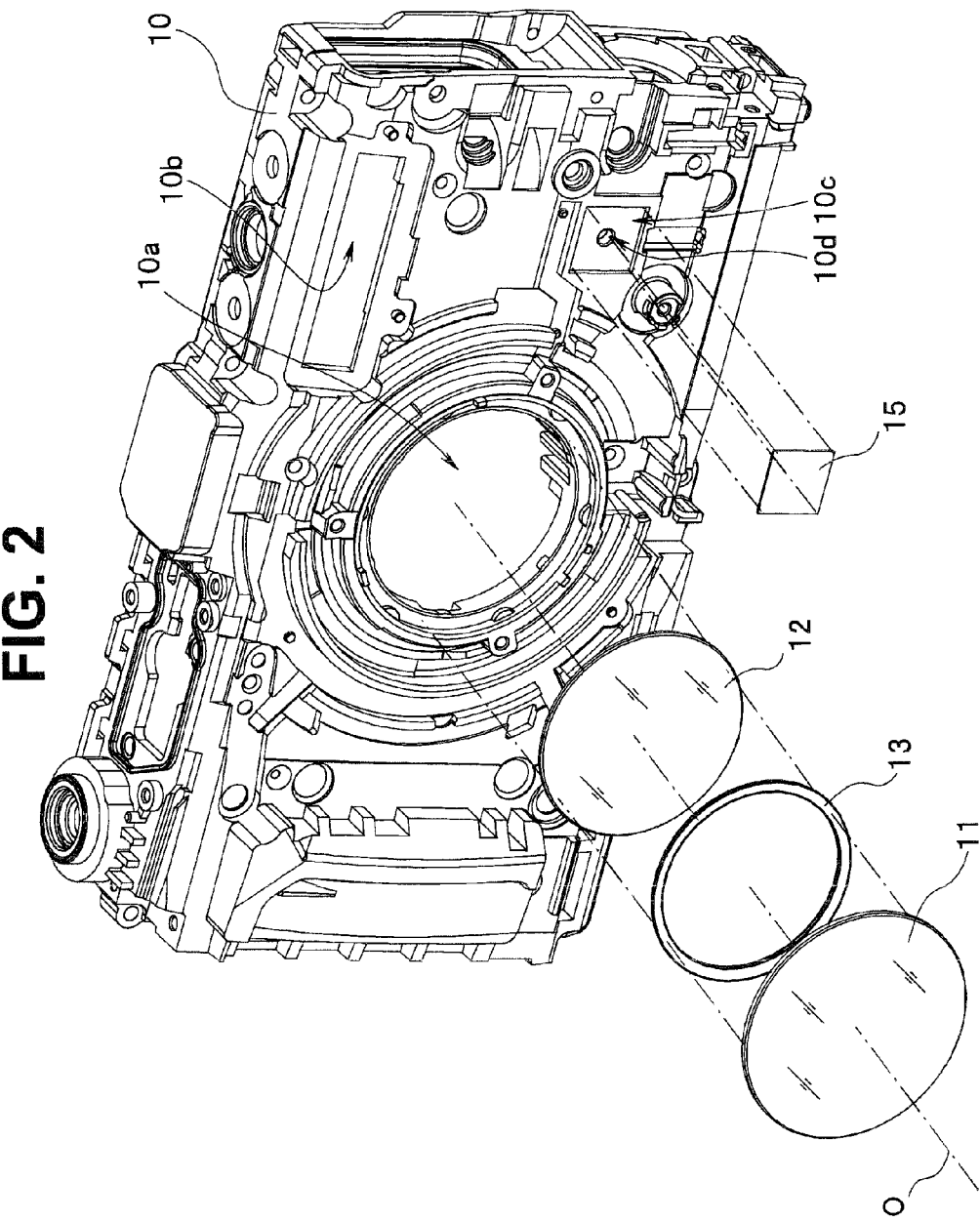
FIG. 2 is an external perspective view showing main parts of an internal configuration of the optical apparatus (the image pickup apparatus) in FIG. 1, where structural members provided to an image pickup opening window are shown in particular.

FIG. 1 is an external perspective view mainly showing the front surface of an optical apparatus (an image pickup apparatus) according to an embodiment of the present invention. FIG. 2 is an external perspective view showing main parts of an internal configuration of the optical apparatus (the image pickup apparatus) in FIG. 1, where structural members provided to an image pickup opening window are shown in particular. In FIG. 2, a basic housing (a main body housing) of the optical apparatus (an image pickup apparatus 1) of the present embodiment from which an exterior member covering the outer surface is removed is shown. Also, structural members not directly relevant to the present invention, such as various structural units housed and disposed inside the main body housing, or more specifically, an image pickup unit including an image pickup optical system and an image pickup device, a display unit including a display panel, an electrical structural unit including a main board for control, and various operation members provided on the outside of the main body housing, are omitted from FIG. 2.

Figure 3:
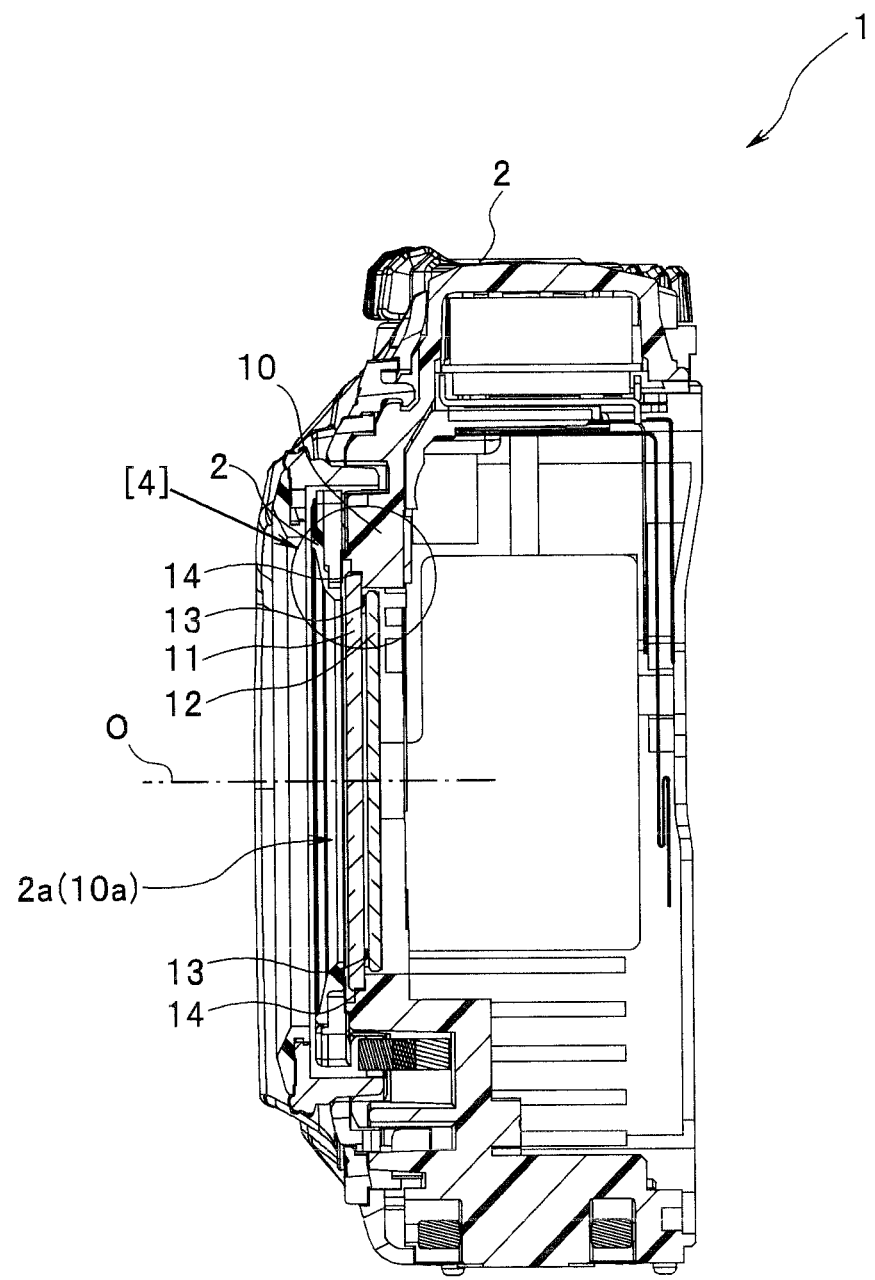
FIG. 3 is a longitudinal cross-sectional view along a plane indicated by arrows [3] in FIG. 1.
Figure 4:
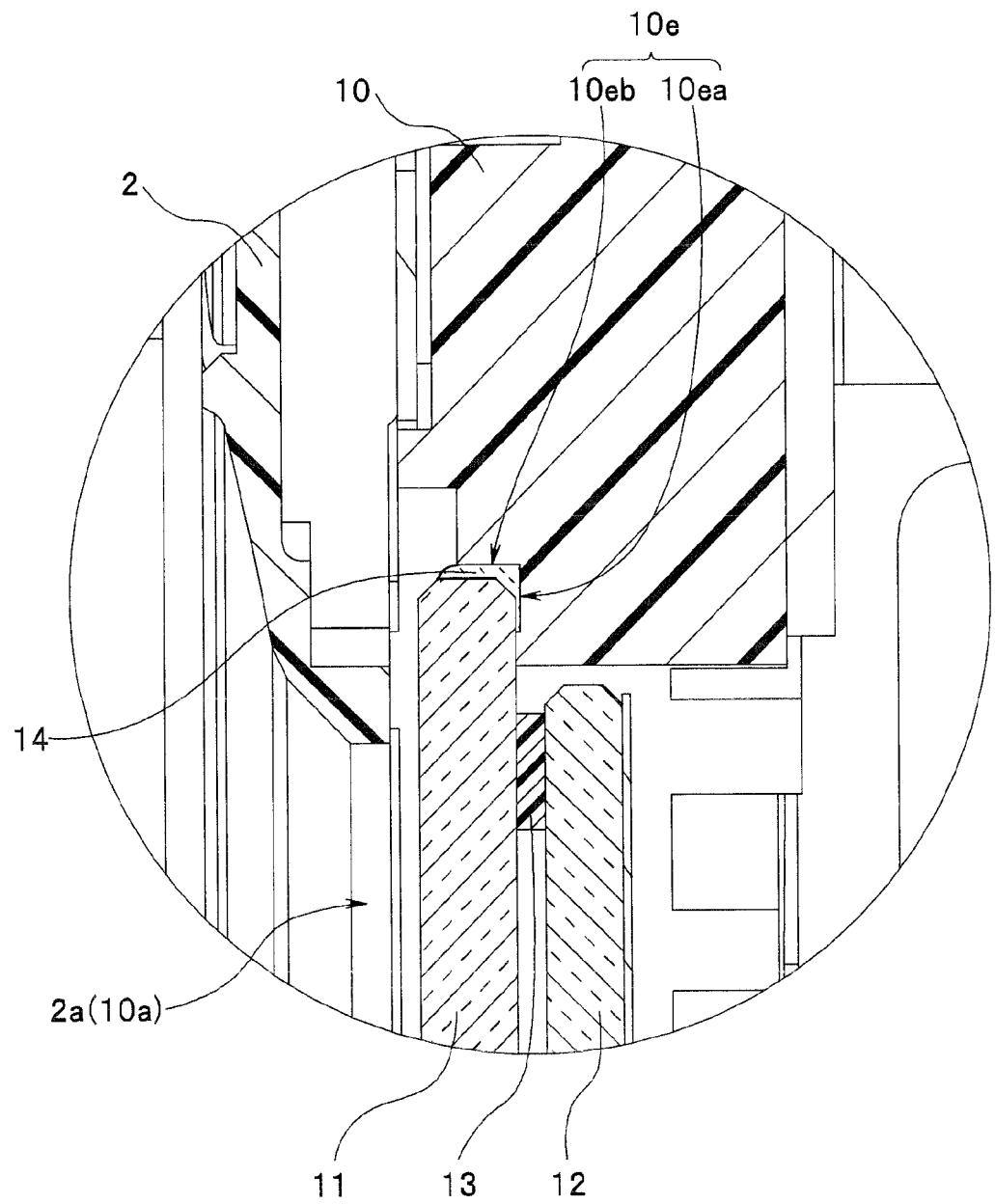
FIG. 4 is a cross-sectional view showing main parts in a part indicated by a reference numeral [4] in FIG. 3 in an enlarged manner.

FIG. 3 is a longitudinal cross-sectional view along a plane indicated by arrows [3] in FIG. 1. FIG. 4 is a cross-sectional view showing main parts in a part indicated by a reference numeral [4] in FIG. 3 in an enlarged manner.

As described above, the image pickup apparatus 1, which is the optical apparatus according to an embodiment of the present invention, has a waterproof property so as to be used in water, a dustproof property, impact resistance and weatherability, and also has an anti-fog property by causing an image pickup opening window to have a multipane window structure.

First, a schematic configuration of the image pickup apparatus 1 according to the present embodiment will be described below by referring mainly to FIGS. 1 and 2.

The image pickup apparatus 1 according to the present embodiment is configured by including a main body housing 10 as a basic housing (not shown in FIG. 1; see FIG. 2), various structural units (such as an image pickup unit including an image pickup optical system and an image pickup device, a display unit including a display panel, an electrical structural unit including a main board for control, and the like; not shown) housed inside the main body housing 10, a plurality of exterior members (2, 3; not shown in FIG. 2; see FIG. 1) covering the outer surface of the main body housing 10, and a plurality of operation members (4 to 8; not shown in FIG. 2; see FIG. 1), and has a waterproof property or a drip-proof property.

As shown in FIG. 2, the main body housing 10 is a basic structural member of a shape having a space inside, such as a substantially rectangular box shape. As described above, various structural units, not shown, are accommodated inside the main body housing 10.

The outer surface of the main body housing 10 is covered by a plurality of exterior members (2, 3). For example, a front surface cover 2 is formed to substantially cover the front surface, a part of the top surface, the bottom surface, the left and right side surfaces, and a part of the rear surface, among the respective outer surfaces of the main body housing 10. Also, a top cover 3 is formed to cover a part (upper surface, left corner portion) of the upper surface of the main body housing 10. Note that the exterior members include, in addition to the front surface cover 2 and the top cover 3, a rear surface cover covering a part of the rear surface of the main body housing 10, for example. The rear surface cover is a part which is not seen in FIG. 1, and is omitted from the drawing and the description.

A substantially circular image pickup opening 2a is formed at substantially the center of the front surface cover 2 (see FIG. 1). Correspondingly, a substantially circular image pickup opening 10a is formed at substantially the center of the front surface of the main body housing 10 (see FIG. 2). Note that the image pickup openings 2a, 10a are shown to be substantially circular, but may have other shapes without being limited to a circular shape.

The image pickup openings 2a, 10a substantially coincide with each other when the front surface cover 2 is assembled with the main body housing 10 (state shown in FIG. 1). The image pickup openings 2a, 10a are openings for guiding a light flux from an object into the image pickup apparatus 1. That is, the housing (the main body housing 10) has an opening (the image pickup opening 10a) for letting a light flux pass through. Note that a reference sign O shown in FIGS. 1 and 2 indicates a substantially center axis of the image pickup openings 2a, 10a, and also indicates an optical axis of a light flux from an object entering the image pickup optical system of the image pickup apparatus 1.

Furthermore, a substantially rectangular flash light emitting window 2b is formed at a top right portion of the front surface of the front surface cover 2 (see FIG. 1). Correspondingly, a substantially rectangular opening 10b for the flash light emitting window is formed at a top right portion of the front surface of the main body housing 10 (see FIG. 2). A light emitting section of a flash light emitting apparatus is provided at the flash light emitting window 2b and the opening 10b for the flash light emitting window.

The plurality of operation members (4 to 8) are disposed partially exposed from the outer surface of the exterior members (2, 3) (see FIG. 1).

For example, an accessory mounting button 8 is disposed on the front surface of the front surface cover 2, near the image pickup opening 2a. The accessory mounting button 8 is an operation member to be operated at the time of mounting/unmounting of an accessory to be attached around the image pickup opening 2a. The accessory mounting button 8 is a push-type operation member, for example. The accessory mounting button 8 is configured to be mechanically coordinated with an accessory lock mechanism which is disposed on the outside of the main body housing 10. Note that the accessory lock mechanism is a part which is not directly relevant to the present invention, and illustration of the mechanism and description of detailed configuration of the mechanism are omitted.

Furthermore, a plurality of operation members (4 to 7) are disposed on the top cover 3. As described above, the top cover 3 is an exterior member covering a part (upper surface, left corner portion) of the outer surface of the image pickup apparatus 1. Moreover, the top cover 3 is configured such that each of the plurality of operation members (4 to 7) is partially exposed to the outside so as to allow operation of each operation member from outside. That is, the top cover 3 is configured to expose parts of the plurality of operation members (4 to 7) and to cover other parts. Furthermore, the top cover 3 also functions as a holding member for holding a rotation operation lever 4 among the plurality of operation members (4 to 7) in a manner allowing a rotation operation of the lever.

Among the plurality of operation members (4 to 7), the rotation operation lever 4 is an operation member (a zoom lever) for performing a zooming operation, for example. Also, among the plurality of operation members, a push-type operation member indicated by a reference numeral 5 is a release operation member for performing a shutter release operation (hereinafter referred to as a shutter release button 5), for example. Furthermore, among the plurality of operation members, a push-type operation member indicated by a reference numeral 6 is a power operation member for performing a power on/off operation of the image pickup apparatus 1 (hereinafter referred to as a power button 6), for example. Moreover, among the plurality of operation members, a rotation-type operation member indicated by a reference numeral 7 is a setting switching member for performing various setting operations (hereinafter referred to as a setting dial 7), for example.

Note that operation inputs from the plurality of operation members (4 to 7) act on a plurality of corresponding electrical structural members (switch members; not shown) mounted on an electrical board (not shown) disposed inside the main body housing 10 so that predetermined control is executed.

On the other hand, a first transparent window member 11 (a first window member) and a second transparent window member 12 (a second window member) are disposed in the image pickup opening 10a of the main body housing 10. The first transparent window member 11 and the second transparent window member 12 are disposed in a manner covering the image pickup opening 10a while letting a light flux pass through. That is, the first transparent window member 11 and the second transparent window member 12 configure a multipane window structure formed from a plurality of window members (in the example of the present embodiment, a double pane window structure formed from two window members).

Note that the first transparent window member 11 and the second transparent window member 12 are each formed by a transparent member having a flat plate shape, such as a plate glass or a plate-shaped transparent member made of acryl or polycarbonate, for example. Note that the present embodiment describes an example where the first transparent window member 11 and the second transparent window member 12 are formed to be substantially circular in accordance with the image pickup openings 2a, 10a. However, the shape of each of the first transparent window member 11 and the second transparent window member 12 is not limited to the shape cited above as an example. The first transparent window member 11 and the second transparent window member 12 may have any shape as long as the image pickup openings 2a, 10a can be covered.

That is, as shown in FIG. 4, an outer edge portion of the first transparent window member 11 is placed on a step portion 10e of the main body housing 10. The entire outer edge portion of the first transparent window member 11 is bonded to a placement surface 10ea and a side wall surface 10eb (see FIG. 4) of the step portion 10e by an adhesive 14, for example. As described, the first transparent window member 11 is disposed to cover the image pickup opening 10a, and is disposed in a water-tight manner with respect to the image pickup opening 10a. According to such a configuration, the waterproof property is secured between the two (the first transparent window member 11 and the image pickup opening 10a of the main body housing 10).

Furthermore, a surface of a sealing member 13 is stuck to the rear surface side of the first transparent window member 11, entirely around and near the outer edge portion. As the sealing member 13, a so-called double-sided tape of a stretchable material having adhesive applied on both surfaces is used, for example. The sealing member 13 is formed, according to the shapes of the first transparent window member 11 and the second transparent window member 12, for example, into an annular shape of a diameter smaller than the diameters of the first transparent window member 11 and the second transparent window member 12. The second transparent window member 12 is stuck (fixed) by the sealing member 13 to the outer edge portion of the first transparent window member 11, on the rear surface side. Note that, according to the configuration of the present embodiment, the outer diameter of the first transparent window member 11 is greater than the outer diameter of the second transparent window member 12.

Furthermore, in such a case, the sealing member 13 forms, between the first transparent window member 11 and the second transparent window member 12, a space (an airtight space) where gas (air) is sealed. The sealing member 13 here is formed using an elastic material.

Simply put, the first window member (the first transparent window member 11) is disposed to cover the opening (the image pickup opening 10a) while letting a light flux from an object pass through. Also, the second window member (the second transparent window member 12) is overlapped with the first window member (the first transparent window member 11), and is fixed to the first window member (the first transparent window member 11) by the sealing member 13.

The sealing member 13 is formed of a stretchable material. Also, the sealing member 13 is provided along the outer edge of the first transparent window member 11 or the second transparent window member 12 so as to form a sealed space portion (an airtight space) between the first transparent window member 11 and the second transparent window member 12.

Accordingly, for example, in a case where the gas (air) in the airtight space between the first transparent window member 11 and the second transparent window member 12 is expanded or compressed, the sealing member 13 is stretched or contracted by the elastic force of the sealing member 13 to thereby change and adjust the volume inside the airtight space while maintaining the airtight state of the airtight space.

A sheet placement portion 10c is formed on the front surface of the main body housing 10, near and on the right of the image pickup opening 10a. The sheet placement portion 10c is formed having a recessed step with respect to the front surface of the main body housing 10, and as a whole, the sheet placement portion 10c is substantially rectangular. Moreover, a through hole 10d penetrating the front surface of the main body housing 10 is drilled at a substantially center portion of the sheet placement portion 10c. A waterproof breathable sheet 15 which is formed into a sheet shape by using a fabric material, and which has a waterproof property and breathability is disposed on the sheet placement portion 10c. Moreover, the waterproof breathable sheet 15 is disposed on the through hole 10d, which is a vent opening, in a manner blocking the vent opening (the through hole 10d).

That is, the waterproof breathable sheet 15 is disposed to cover the through hole 10d. Here, the through hole 10d of the housing (the main body housing 10) is a vent opening provided to communicate the inside and the outside of the optical apparatus (the image pickup apparatus 1).

As described above, because the through hole 10d of the sheet placement portion 10c is covered by the waterproof breathable sheet 15, the main body housing 10 has a waterproof property, and at the same time, has good ventilation through the through hole 10d.

Other components are parts which are not directly relevant to the present invention, and illustration of the components and description of detailed configuration of the components are omitted so as to prevent the drawings from becoming complicated. As the omitted components, the same components as the components applied to an image pickup apparatus which is a conventional optical apparatus are assumed to be used.

As described above, according to the embodiment described above, the image pickup apparatus 1, which is an optical apparatus, adopts a double pane window structure including two window members (the first transparent window member 11, the second transparent window member 12) for the openings (the image pickup openings 2a, 10a) for letting a light flux from an object pass through, so as to secure the waterproof property, and also the anti-fog property, of the openings (the image pickup openings 2a, 10a).

Note that the sealing member 13 according to the present embodiment is formed from a main body (for example, a film member) of the sealing member and double-sided adhesives provided on both surfaces, and it is enough if at least one or all of the parts is even slightly stretchable.

Furthermore, even if the sealing member 13 is not stretchable, it is enough if the second window member is made of an elastically deformable material or has a shape, such as a thin plate shape, allowing elastic deformation. In such a case, it is enough if the optical performance of the image pickup unit used for the present image pickup apparatus is not greatly reduced.

In the present case, the two window members (the first transparent window member 11, the second transparent window member 12) are bonded together with the sealing member 13 in-between, and an airtight space is formed between the two window members. The sealing member 13 here uses a stretchable material having elasticity.

According to such a configuration, the sealing member 13 is configured to stretch or contract along the direction of the optical axis O according to expansion or compression of air (gas) inside the airtight space while maintaining the airtight state of the airtight space at all times. The sealing member 13 is thus capable of adjusting the volume inside the airtight space. Accordingly, the force of breaking the first transparent window member 11 or the second transparent window member 12 caused by expansion of the gas (air) in the airtight space may be reduced. The first transparent window member 11 or the second transparent window member 12 may thereby be prevented from breaking.

Note that the present embodiment describes that the main housing is capable of maintaining a water-tight state, but the present embodiment is also applicable to a regular optical apparatus which is not water-tight, or to an image pickup apparatus including such an optical apparatus.

According to the configuration of the present application, respective light flux transmitting surfaces of the inside and outside of the airtight space formed between the first transparent window member and the second transparent window member may be prevented from being fogged, and also breakage due to the air pressure difference between the space portion and the outside may be mitigated.

Figure 5:
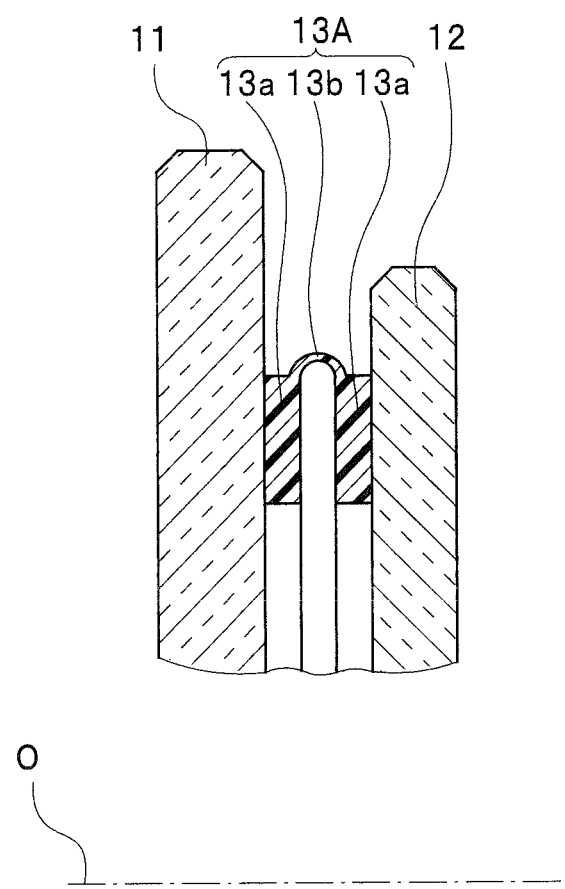
FIG. 5 is a cross-sectional view showing main parts in a first modified example of the embodiment of the present invention in an enlarged manner.

In addition, in the present embodiment, the sealing member 13 is configured to deform in the direction along the optical axis O, to thereby allow relative displacement of the two window members (11, 12) in the direction along the optical axis O. However, the present invention is not limited to this exemplification in the embodiment. For example, as shown in a first modified example in FIG. 5, a sealing member 13A including an annular thin film portion 13b formed around the optical axis O so as to connect the two window members (11, 12) may be provided between the two window members (11, 12). Note that FIG. 5 only illustrates the two window members and the sealing member for simplification, in order to illustrate the arrangement of the two window members and the sealing member and the shape of the sealing member.

Such a configuration allows a sealed space portion between the two window members (11, 12) to be expanded or compressed not only in the direction along the optical axis O but also in a radial direction of the respective window members (11, 12). Note that, in FIG. 5, the part indicated by the reference numeral 13a is an annular base portion formed integrally with the thin film portion 13b. The base portion 13a is pasted on the respective window members (11, 12) through an adhesive member such as a double-sided tape.

Furthermore, description will be made below on other modified examples of the sealing member in the double pane window structure.

Figure 6:
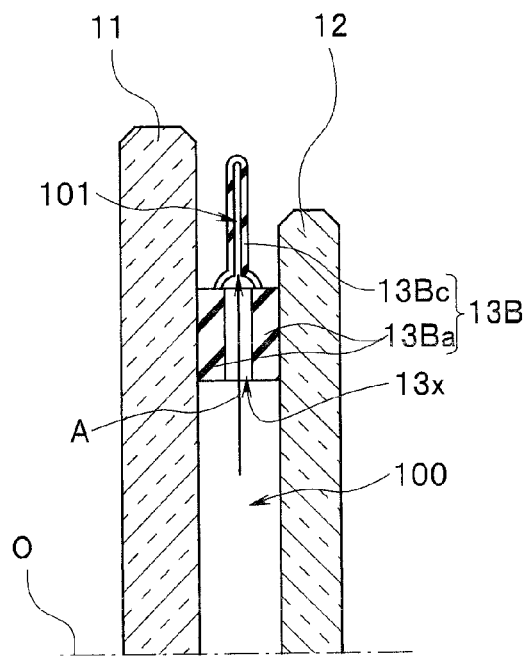
FIG. 6 is a cross-sectional view showing main parts of a sealing member under a normal environment in a second modified example of the embodiment of the present invention in an enlarged manner.
Figure 7:
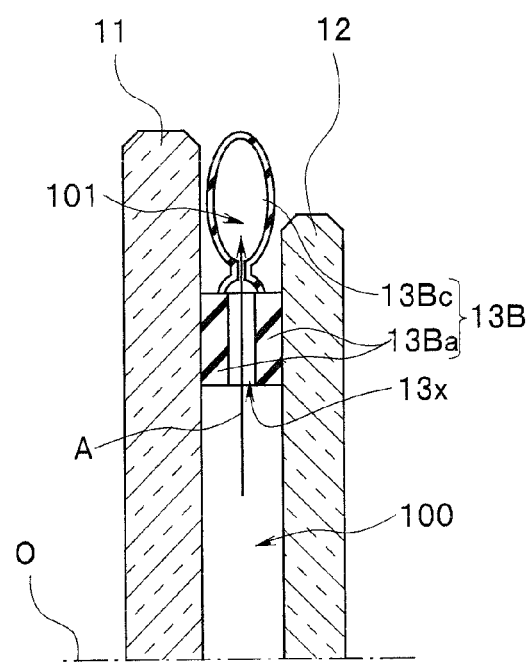
FIG. 7 is a cross-sectional view showing main parts of the sealing member under a low pressure environment in the second modified example of the embodiment of the present invention in an enlarged manner.
Figure 8:
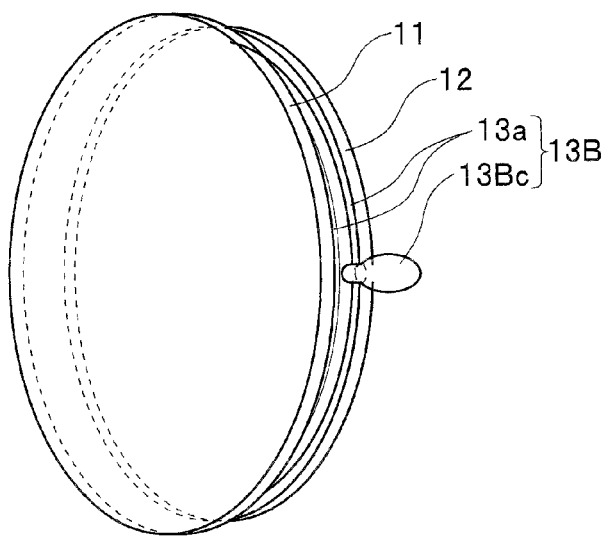
FIG. 8 is an external perspective view showing main parts of external appearances of the double pane window and the sealing member in the state shown in FIG. 7.

FIGS. 6 to 8 are views showing a second modified example of the sealing member in the double pane window structure in the image pickup apparatus according to the above-described embodiment. Among these figures, FIG. 6 is a cross-sectional view showing, in an enlarged manner, the main parts of the sealing member when the image pickup apparatus is under a normal environment. Further, FIG. 7 is a cross-sectional view showing, in an enlarged manner, the sealing member when the image pickup apparatus is under a low pressure environment. FIG. 8 is an external perspective view showing main parts of external appearances of the double pane window and the sealing member in the state shown in FIG. 7.

Note that illustrations are simplified in FIGS. 6 to 8, to clearly show the arrangement of the two window members 11, 12, and the sealing member 13B, and the shape of the sealing member 13B.

The basic configuration of the sealing member 13B in the second modified example is substantially the same as that of the sealing member 13 in the above-described embodiment. The sealing member 13B in the present modified example includes an annular base portion 13Ba and a balloon 13Bc.

The annular base portion 13Ba is an elastic member which is held between the two window members 11 and 12 in the similar manner as the annular base portion 13a in the above-described embodiment, to thereby form an airtight space portion 100 between the window members, and which adjusts the interval between the two window members in the direction of the optical axis O.

The annular base portion 13Ba in the present modified example is different in that the annular base portion 13Ba includes, on a part on the circumferential surface thereof, a ventilation port 13x that allows the airtight space portion 100 to communicate with outside.

The ventilation port 13x is provided with a balloon 13Bc. The balloon 13Bc is formed in a bag shape using a thin film made of a material having a high stretching property such as a natural rubber or latex, for example, and includes one opening portion, that is, formed in a balloon shape. In this case, a stretchable internal space of the bag-shaped part of the balloon 13Bc is referred to as a sub-chamber 101.

When the balloon 13Bc is in a normal state, the balloon 13Bc is formed in a shape same as that of a deflated balloon. When a gas is flowed into the sub-chamber 101 from the opening portion, the balloon 13Bc stretches by the elastic force thereof, and is changed into an inflated state like a balloon.

The balloon 13Bc is fixed such that the opening portion of the balloon 13Bc is coincident with the ventilation port 13x of the sealing member 13B. That is, such a configuration allows the airtight space portion 100 and the sub-chamber 101 to be communicated with each other.

When the image pickup apparatus is under the normal environment, the sealing member 13B having such a configuration is in the state where the sub-chamber 101 of the balloon 13Bc is deflated, as shown in FIG. 6, for example.

When the image pickup apparatus that is under the normal environment is placed under an environment in which the outside pressure is low, for example, the gas (air) in the airtight space portion 100 is expanded. Then, the gas (air) flows into the sub-chamber 101 of the balloon 13Bc through the ventilation port 13x and the opening portion, as shown by the arrow A in FIGS. 6 and 7. This causes the sub-chamber 101 to expand to be changed into the state shown in FIGS. 7 and 8. That is, under the low pressure environment, the gas (air) expanded in the airtight space portion 100 flows into the sub-chamber 101 of the balloon 13Bc, to cause the balloon 13Bc to be inflated.

On the other hand, when the gas (air) in the airtight space portion 100 is contracted, the sealing member 13B contracts in the direction along the optical axis O similarly as in the above-described embodiment, to thereby adjust the volume in the airtight space portion 100.

With such a configuration, the sealing member 13B according to the present modified example is capable of adjusting the volume in the airtight space portion 100 in accordance with the expansion or contraction of the gas (air) in the airtight space portion 100 while constantly maintaining the airtight state of the airtight space portion 100.

Figure 9:
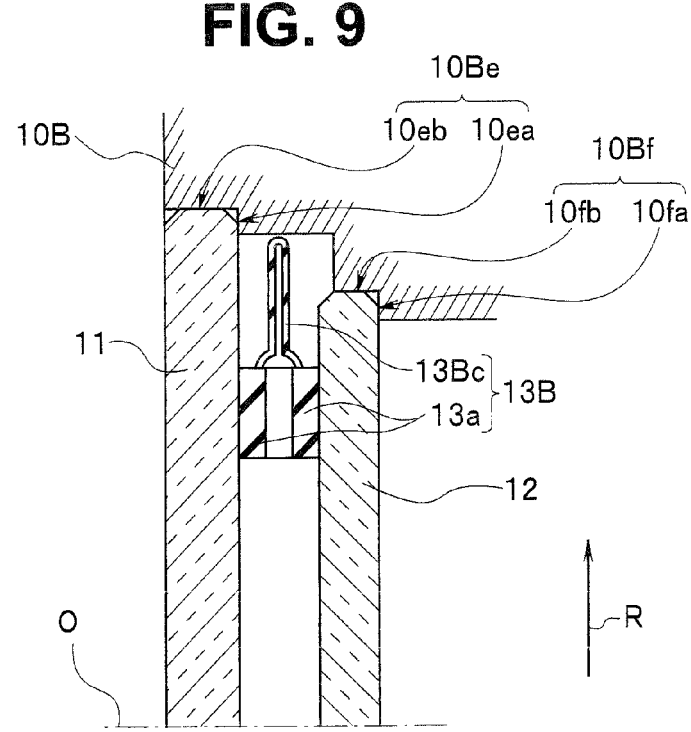
FIG. 9 is a cross-sectional view showing main parts in a third modified example of the embodiment of the present invention in an enlarged manner.

Furthermore, in addition to the configuration in the above-described second modified example, the configuration as shown in FIG. 9 may be employed. FIG. 9 is a cross-sectional view showing the main parts in a third modified example of the embodiment of the present invention in an enlarged manner.

In the third modified example, the movement of both of the two window members 11 and 12 in the radial direction is restricted in the double pane window structure using the sealing member 13B applied to the second modified example.

That is, an outer edge portion of the first transparent window member 11 is placed on a step portion 10Be of the main body housing 10B similarly as in the above-described embodiment. In this state, the entire outer edge portion of the first transparent window member 11 is bonded to a placement surface 10ea and a side wall surface 10eb (see FIG. 9) of the step portion 10Be by an adhesive (not shown in FIG. 9; see the reference numeral 14 in FIG. 4). The first transparent window member 11 is disposed so as to cover the image pickup opening (not shown in FIG. 9; see the reference numeral 10a in FIGS. 2 to 4), and is disposed in a water-tight manner with respect to the image pickup opening (10a).

According to such a configuration, the waterproof property is secured between the first transparent window member 11 and the image pickup opening (10a) of the main body housing 10B. In addition, such a configuration restricts the movement of the first transparent window member 11 in the radial direction which is perpendicular to the optical axis O and which is along the arrow R in FIG. 9 and the movement of the first transparent member 11 in the direction toward the rear surface side in the direction along the optical axis O.

Furthermore, in the present modified example, also the movement of the second transparent window member 12 is restricted with a similar configuration as that of the first transparent window member 11.

That is, an outer edge portion of the second transparent member 12 is placed on a step portion 10Bf of the main body housing 10B. In this state, the entire outer edge portion of the second transparent member 12 is bonded to a placement surface 10fa and a side wall surface 10fb (see FIG. 9) of the step portion 10Bf by an adhesive (not shown in FIG. 9; same as the reference numeral 14 in FIG. 4). With such a configuration, the second transparent window member 12 is disposed so as to cover the image pickup opening (10a), and is disposed in a water-tight manner with respect to the image pickup opening (10a).

According to such a configuration, the waterproof property is secured also between the second transparent window member 12 and the image pickup opening (10a) of the main body housing 10B. In addition, such a configuration restricts the movement of the second transparent window member 12 in the radial direction which is perpendicular to the optical axis O and which is along the arrow R in FIG. 9 and the movement of the second transparent window member 12 in the direction toward the rear surface side in the direction along the optical axis O.

With such a configuration, the modified example is capable of ensuring the parallelism of the two window members 11, 12 while constantly maintaining the airtight state of the airtight space portion 100.

Note that the material of the sealing member 13, 13A, 13B is preferably a stretchable material, as described above, such as an elastomer material having elasticity.

Furthermore, high-pressure gas may be sealed in the airtight space portion 100 between the two window members 11, 12.

Alternatively, a gas having a thermal conductivity less than that of the normal gas or a gas having a low expansion rate lower than that of the normal gas may be sealed in the airtight space portion 100 between the two window members 11 and 12, instead of the normal gas (air). Such a configuration enables thermal expansion and contraction of the gas in the airtight space portion 100 to be suppressed.

Furthermore, instead of using the sealing member, a configuration can be considered in which convex coating portions, which are formed in a ring shape in the circumferential direction, are provided respectively on the opposing surfaces of the two window members in the direction along the optical axis, and the two window members are bonded to each other so as to sandwich the respective convex coating portions. In such a configuration, it is sufficient that the coating material has a slight thickness. In addition, a material which can coat the two window members made of a glass, a resin material, or the like, is used as the coating material. For example, if the two window members are made of glass, DLC, fluorine coating, or the like can be applied. In addition, if the two window members are made of resin, fluorine coating or the like can be applied.

If the airtight space portion is thus formed by the coating portions, the gap between the two window members 11, 12 can be thinner, which results in the airtight space portion having a small volume. Therefore, the volume change due to the expansion or contraction of the internal gas in the airtight space portion can be restrained from significantly changing. Furthermore, deformation of the two window members 11, 12 can be suppressed.

Figure 10:
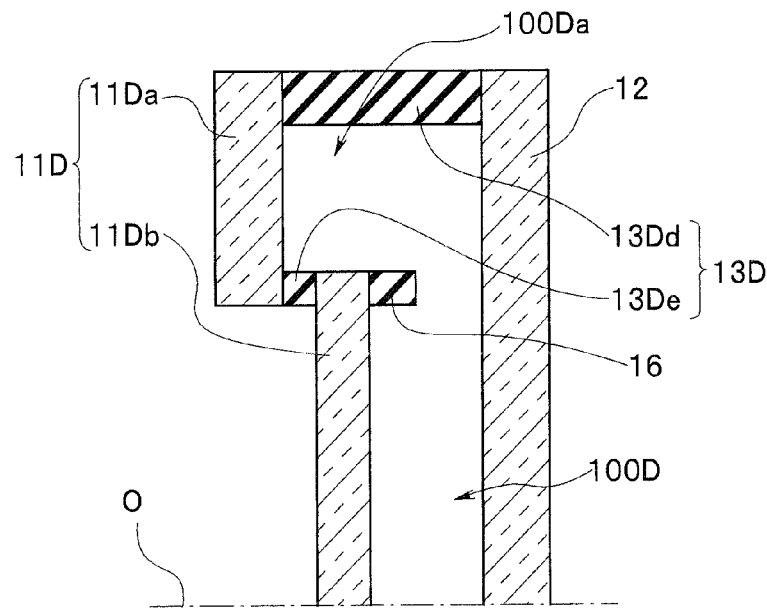
FIG. 10 is a cross-sectional view showing main parts of a double pane window structure in a fourth modified example of the embodiment of the present invention in an enlarged manner.

Next, FIG. 10 illustrates the double pane window structure in the fourth modified example. The present modified example is different in that a first transparent window 11D is employed instead of the first transparent window member 11 in the above-described embodiment and the respective modified examples. In accordance with the first transparent member 11D, the configuration of the sealing member (13D) provided between the two window members is also different.

That is, the first transparent window 11D in the present modified example is configured by two members, i.e., an annular portion 11Da and a window portion 11Db. The annular portion 11Da of the two members is a transparent member that mainly covers a neighboring region of the outer edge portion of the image pickup opening 10a. The window portion 11Db is a transparent member that mainly covers the neighboring region of the substantially center portion of the image pickup opening 10a.

The sealing member 13D in the present modified example is configured by two members, i.e., a first sealing ring 13Dd and a second sealing ring 13De. The first sealing ring 13Dd of the two members is an elastic member which is held between the outer edge portion (rear surface side) of the annular portion 11Da and the outer edge portion (front surface side) of the second transparent window 12 and which adjusts the interval between the annular portion 11Da and the second transparent window 12 in the direction along the optical axis O. In addition, the second sealing ring 13De is an elastic member which is held between the inner edge portion (rear surface side) of the annular portion 11Da and the outer edge portion (front surface side) of the window portion 11Db and which adjusts the interval between the annular portion 11Da and the window portion 11Db in the direction along the optical axis O. Note that the annular portion 11Da is not necessarily a transparent member.

Note that a buffer ring 16 is further provided in the double pane window structure in the present modified example. The buffer ring 16 is an elastic member provided along the outer edge portion (rear surface side) of the window portion 11Db. The buffer ring 16 is formed by using the material same as that of the sealing member 13D.

In such a structure, when the window portion 11Db of the first transparent window 11D is moved toward the second transparent window 12 in the direction along the optical axis O, the buffer ring 16 functions as a buffer material that prevents the contact between the window portion 11Db and the second transparent window 12.

With such a configuration, the airtight space portion 100D is capable of securing an extra region indicated by the reference numeral 100Da shown in FIG. 10. That is, such a configuration enables the airtight space portion 100D having a larger volume to be ensured.

Figure 11:
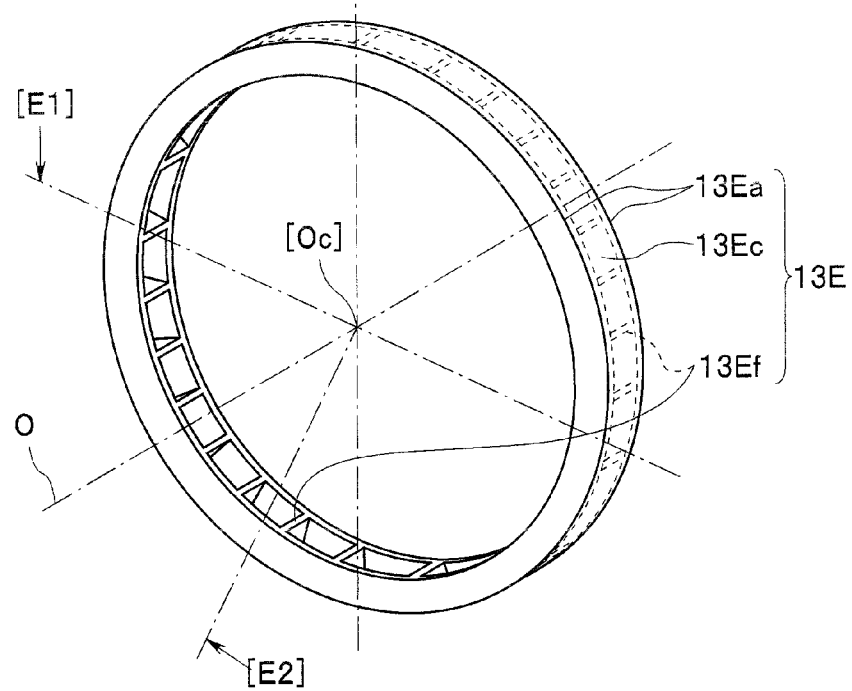
FIG. 11 is an external perspective view showing only a sealing member in a fifth modified example of the embodiment of the present invention.
Figure 12:
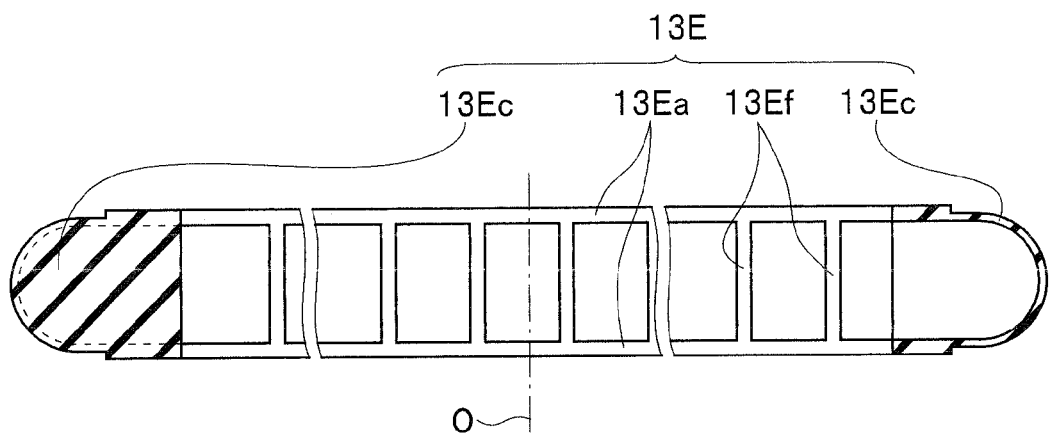
FIG. 12 is a cross-sectional view showing main parts taken along [E1]-[Oc]-[E2] line in FIG. 11 in an enlarged manner.

Next, FIGS. 11 and 12 illustrate a sealing member in the fifth modified example. FIG. 11 is an appearance perspective view. FIG. 12 shows a cross section of the sealing member, and is a cross-sectional view showing the main parts taken along [E1]-[Oc]-[E2] line in FIG. 11 in an enlarged manner. Note that FIGS. 11 and 12 illustrate only the sealing member in the double pane window structure.

As illustrated in the drawings, the sealing member 13E in the present modified example is formed by including two annular portions 13Ea, a plurality of ribs 13Ef, and a thin film portion 13Ec. The sealing member 13E is formed integrally by a material having elasticity.

The two annular portions 13Ea are ring-shaped portions bonded to the vicinities of the respective outer edge portions of the first transparent window 11 and the second transparent window 12.

The plurality of ribs 13Ef are the portions that hold the two annular portions 13Ea with predetermined intervals in the direction along the optical axis O.

The thin film portion 13Ec has a stretching property and is formed in a thin film shape, and disposed so as to cover the outer circumferential surfaces of the two annular portions 13Ea. The thin film portion 13Ec forms the airtight space portion 100. When the gas in the airtight space portion 100 is expanded, the thin film portion 13Ec is stretched to be changed into an inflated state.

The fifth modified example having such a configuration is also capable of providing the same effects as those in the above-described embodiment. In addition, according to the present modified example, the plurality of ribs 13Ef are provided, to thereby be capable of holding the space between the two window members (not shown in FIGS. 11 and 12) in the direction along the optical axis O through the two annular portions 13Ea, and ensuring the parallelism of the two window members.

The present invention is not limited to the embodiment described above, and it is needless to say that various modifications and applications may be made without departing from the spirit of the invention. Furthermore, the embodiment described above includes inventions of various stages, and various inventions may be extracted by appropriately combining the plurality of structural elements disclosed herein. For example, even if some structural elements are removed from all the structural elements shown in the embodiment, if the problem to be solved by the invention can be solved and the advantageous effects of the invention can be achieved, a configuration from which the structural elements have been removed can be extracted as an invention. Furthermore, structural elements of different embodiments may be combined as appropriate. The invention is limited by no other specific embodiments than the appended claims.

The present invention may be widely applied to various electronic apparatuses including other electronic apparatuses having a structure for sealing the opening window to achieve the waterproof property, such as a mobile phone, smartphone, an electronic organizer, an electronic dictionary, a personal digital assistant, a personal computer, a tablet mobile device, a game console, a television, a clock, a navigation apparatus using GPS (global positioning system), without being limited to the image pickup apparatus provided with the image pickup function.

Furthermore, application is also possible to electronic apparatuses having a function of acquiring an image by using an image pickup device and displaying the acquired image by using a display apparatus, such as observation apparatuses including a telescope, binoculars, a monocular, and a microscope.

Moreover, application is also possible to image pickup apparatuses such as a surveillance camera and an in-vehicle camera, in addition to industrial or medical observation apparatuses such as an endoscope and a microscope.

Moreover, application is also possible to a projection-type image display apparatus which projects an image in an enlarged manner by using a transmissive liquid crystal display apparatus, for example.

What is claimed is:

1. An optical apparatus comprising:
   a first optical member that allows a light flux to pass through;
   a transparent second optical member that allows the light flux, which has passed through the first optical member, to pass through;
   a sealing member that is configured by including a stretchable elastic member, the sealing member forming a sealed space portion between the first optical member and the second optical member; and
   a main body that houses the first optical member, the second optical member, and the sealing member,
   wherein,
   at least one of the first optical member and the second optical member is fixed to the main body, and
   the sealing member absorbs a volume change of the space portion by expansion or contraction of the sealing member, when a temperature change or a pressure change occurs.

2. The optical apparatus according to claim 1, wherein the first optical member is fixed to the main body,
   the second optical member is fixed to the first optical member through the sealing member, and
   when the volume change of the space portion occurs, the second optical member moves due to the expansion or contraction of the sealing member, to thereby allow the volume change to be absorbed.

3. The optical apparatus according to claim 1, wherein the sealing member includes a first annular base portion fixed to the first optical member, a second annular base portion fixed to the second optical member, and a thin film portion that joins the first annular base portion and the second annular base portion.

4. The optical apparatus according to claim 1, wherein the first optical member and the second optical member are fixed to the main body,
   the sealing member includes a vent hole provided at the sealed space portion, and a stretchable balloon that communicates with the vent hole, and when a volume of the space portion is expanded, the balloon expands and inflates into a balloon shape.

5. The optical apparatus according to claim 1, wherein the first optical member is fixed to the main body through a first sealing member, and the second optical member has a diameter larger than a diameter of the first optical member, and is fixed to the main body through a second sealing member.

6. The optical apparatus according to claim 5, wherein the first optical member is provided with a buffer member that prevents the first optical member from coming into collision with the second optical member when the space portion formed by the first optical member and the second optical member inflates.

7. The optical apparatus according to claim 1, wherein the first optical member includes:

a first annular portion fixed to the main body; and a second annular portion fixed to the first annular portion through a first sealing member, and the second optical member has a diameter larger than a diameter of the second annular portion, and fixed to the first annular portion through a second sealing member.

8. The optical apparatus according to claim 7, wherein when the space portion formed by the first optical member and the second optical member inflates, the volume change is absorbed by the expansion or contraction of the first sealing member and the second sealing member.

9. The optical apparatus according to claim 8, wherein the second annular portion is provided with a buffer member (16) that prevents the second annular portion from coming into collision with the second optical member.

* * * * *